(No Model.) 5 Sheets—Sheet 1.

W. G. SEARS.
COTTON HARVESTER.

No. 353,466. Patented Nov. 30, 1886.

Witnesses
F. H. Schott
Fred E. Tasker

Inventor
William G. Sears,
By his Attorney
John C. Tasker (No Model.)　　　　　　W. G. SEARS.　　　　5 Sheets—Sheet 2.
COTTON HARVESTER.

No. 353,466.　　　　　　　　　Patented Nov. 30, 1886.

Witnesses
F. H. Schott
Fred E. Tasker

Inventor
William G. Sears,
By his Attorney
John C. Tasker

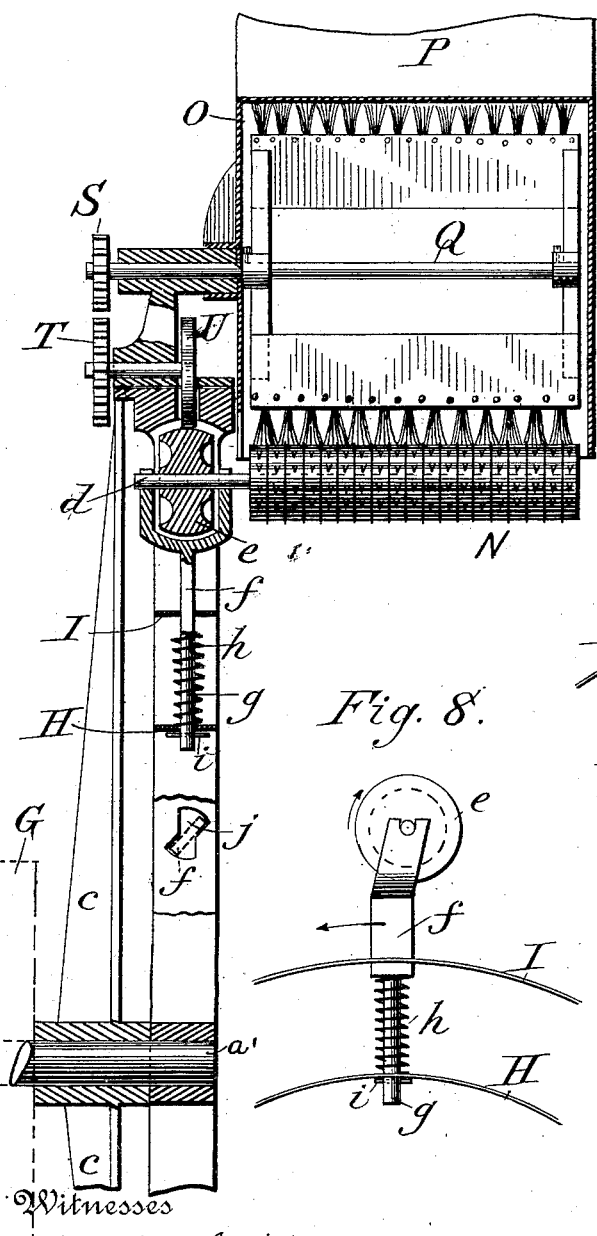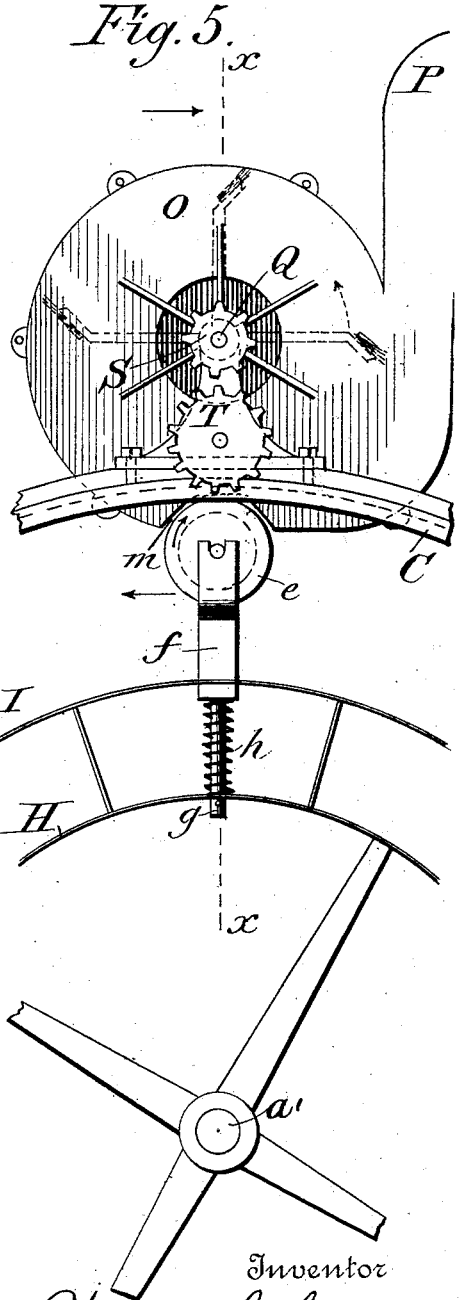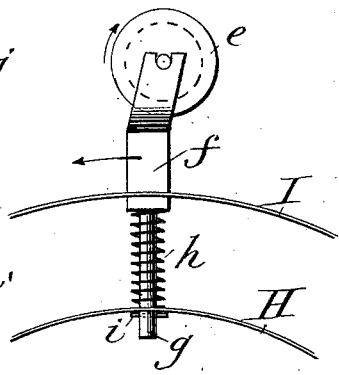

(No Model.)  W. G. SEARS.  5 Sheets—Sheet 4.
COTTON HARVESTER.

No. 353,466.　　Patented Nov. 30, 1886.

Attest:
F. H. Schott
Fred E. Tasker

Inventor:
William G. Sears,
Jr. John C. Tasker,
atty, (No Model.)  5 Sheets—Sheet 5.

W. G. SEARS.
COTTON HARVESTER.

No. 353,466.  Patented Nov. 30, 1886.

Attest:
F. H. Schott
Fred E. Tasker

Inventor:
William G. Sears.
Per John C. Taskewatty

UNITED STATES PATENT OFFICE.

WILLIAM GOFF SEARS, OF CHATTANOOGA, TENNESSEE.

COTTON-HARVESTER.

SPECIFICATION forming part of Letters Patent No. 353,466, dated November 30, 1886.

Application filed December 26, 1885. Serial No. 186,783. (No model.)

*To all whom it may concern:*

Be it known that I, WILLIAM GOFF SEARS, a citizen of the United States, residing at Chattanooga, in the county of Hamilton and State of Tennessee, have invented certain new and useful Improvements in Cotton-Harvesters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in cotton-pickers for gathering cotton from the plants; and it consists in the construction and arrangement of parts, as will be hereinafter fully set forth.

Figure 1:
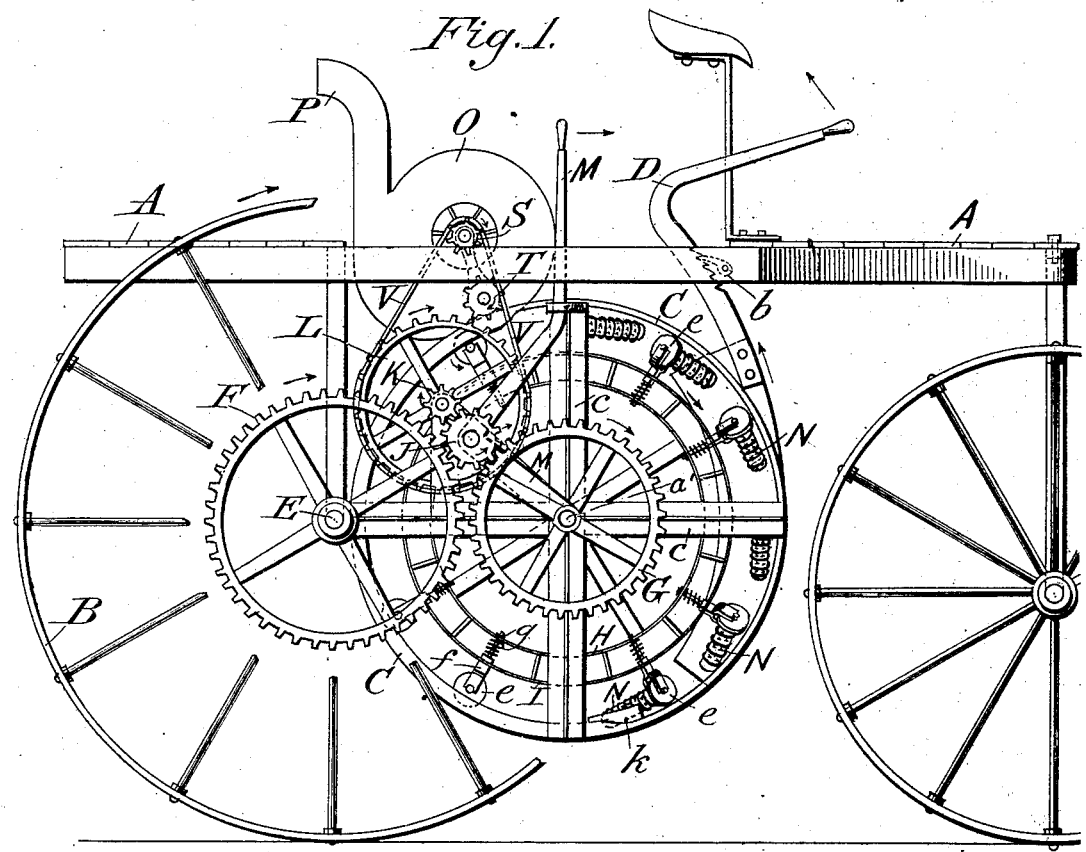
Figure 2:
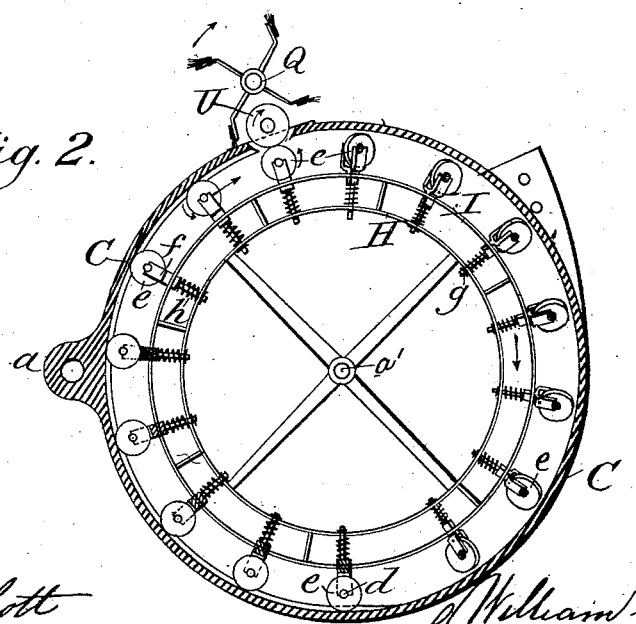
Figure 3:
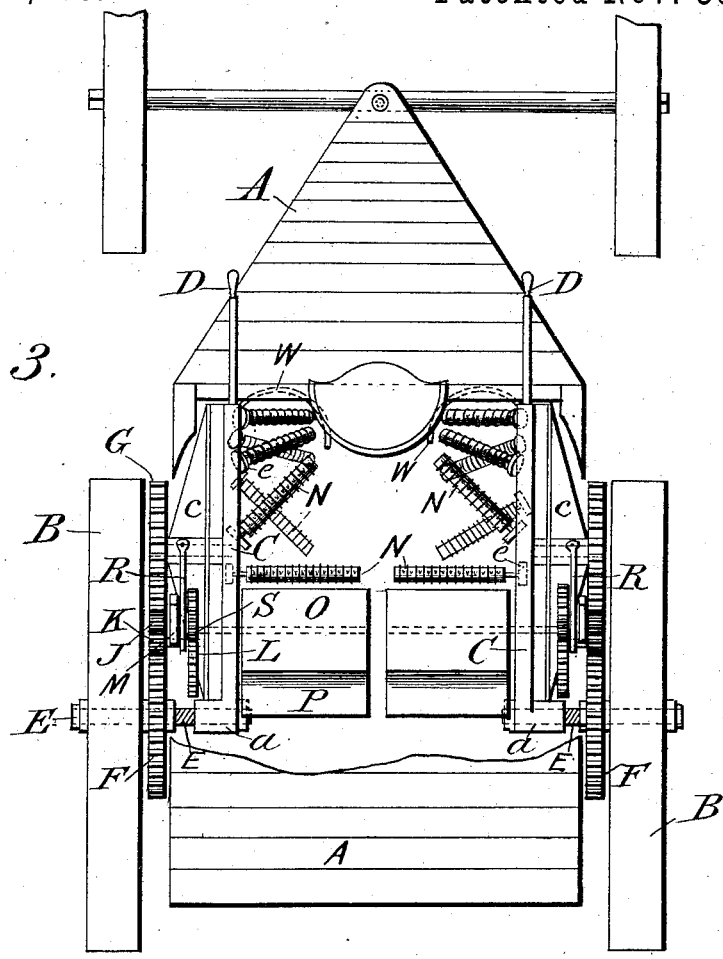
Figure 4:
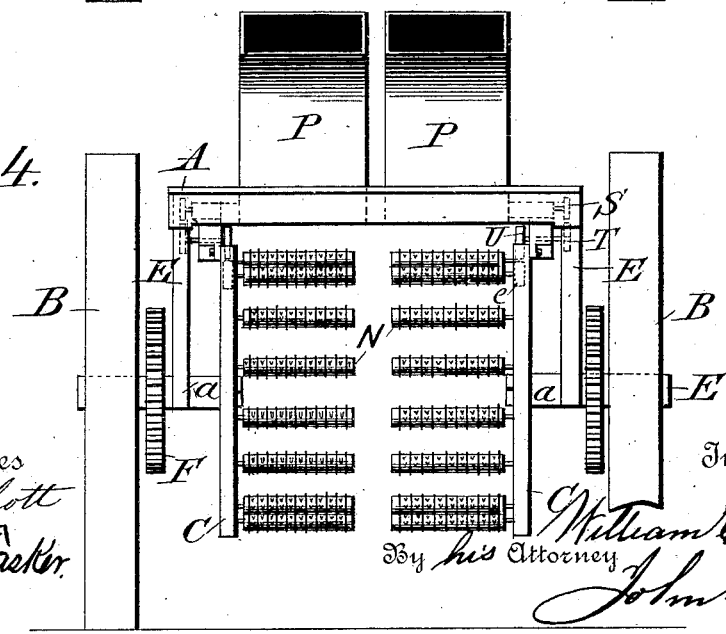
Figure 7:
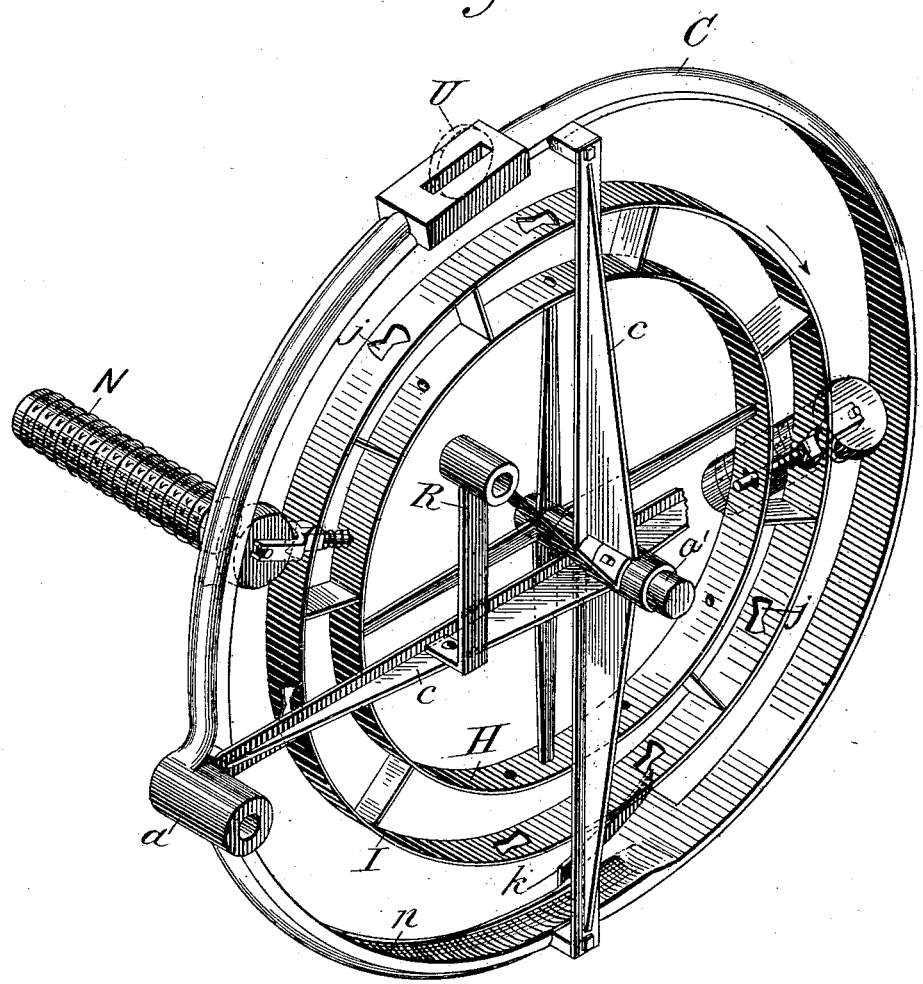
Figure 9:
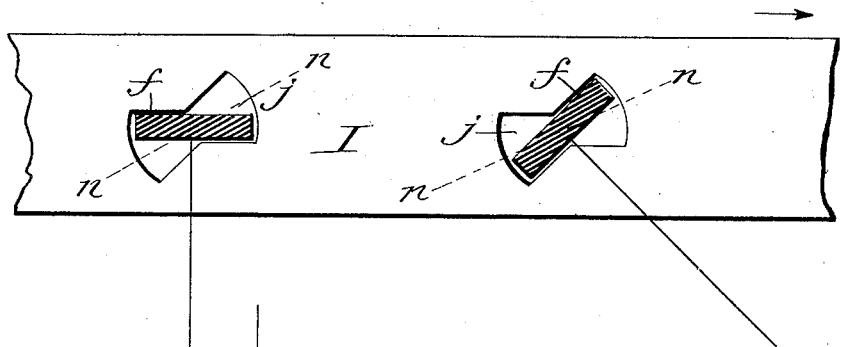
Figure 10:
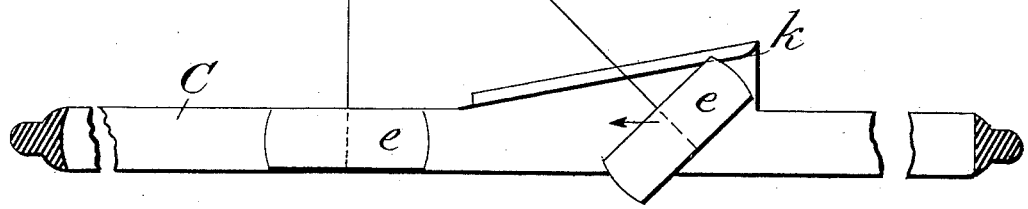
Figure 11:
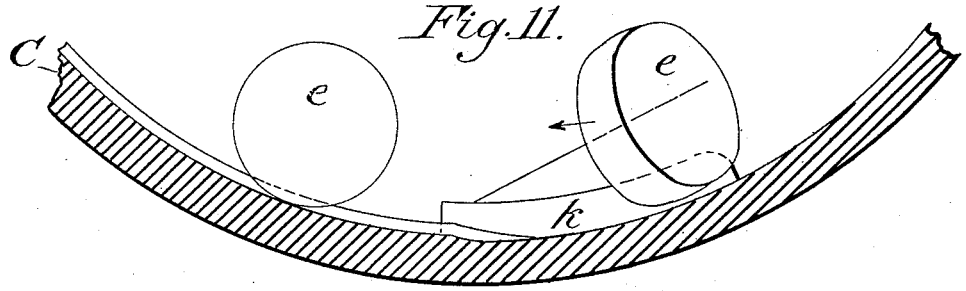

In the annexed drawings, illustrating my invention, Figure 1 is a side elevation of my improved cotton-picker. Fig. 2 is a detail view of the left-hand casing and the parts contained therein when viewed from the middle of the machine, the picker-stems being removed. Fig. 3 is a top plan view of the entire machine. Fig. 4 is a rear end elevation. Fig. 5 is an enlarged detail of the exterior of one of the fan-casings and a portion of the mechanism below. Fig. 6 is a vertical section on the line $x\ x$ of Fig. 5. Fig. 7 is an enlarged perspective of the casing and contained parts shown in side elevation in Fig. 1. Fig. 8 represents a form of the spindles or standards which carry the picker-stems; and Figs. 9, 10, and 11 are enlarged details of portions of the stem-carrying wheels, and show the way in which the stems change from a horizontal to an oblique position, and the reverse.

Like letters of reference designate like parts in the several views.

A represents the platform or floor bottom, and B the drive-wheels, of the carriage of the machine.

E represents the rear axle, generally made in a single piece and of the form shown in Fig. 4, having a cross-bar secured to the platform A and an upright at either end, fashioned with a T shape at the lower extremity, one arm of each T serving as a journal to enter the hub of the wheel, while the other arm supports a cylindrical casing, C, having a projection, $a$, bored to move freely upon the axle. Each of the rear drive-wheels is provided with a gear, F, firmly secured to said wheel, so that the revolution of the drive-wheels during the motion of the carriage will impart motion to the gears.

The casings C are upheld in part by their attachment to the axle E, and in part by means of hand-levers D, which have a portion of their length formed with dentations to engage a pawl, $b$, on the platform A. By this means the casings can be raised or lowered to a greater or less distance from the ground. These casings are preferably provided with cross bars or beams $c\ c$, intersecting near the middle of the casings, at which intersections are formed bearings for the shaft $a'$, upon one end of which is secured a gear-wheel, G, while the other end carries a wheel having an outer rim, I, and an inner rim, H, revolving within the casing and carrying the picking-stems, which gather the cotton from the plant. The actuation of the gear-wheels G will therefore serve to revolve the stem-carrying wheels and impart motion to the picker-stems, in the manner to be presently described.

The gears G are connected with the driving-gears F by means of small intermediate gears, J, carried by the rods or levers M. The lower ends of these levers are bored to fit movably upon the shaft or its box, which carries the gear G, and the upper portion passes through a guard fixed upon the casing C, Fig. 1, and containing a spring whose tension keeps the rod M in such position that the gears J will be in mesh with gears F. The upper ends of rods M serve as hand-levers, and when they are moved forward in the direction of the arrow shown in Fig. 1 the gears J will be disengaged from the gears F, so that the picking mechanism will cease to operate.

The stem-carrying wheels, consisting each of cross-bars at whose intersections are secured to the inner ends of the shafts $a'$ an inner rim, H, and an outer rim, I, revolve within the casings C in the direction indicated by arrows in Figs. 1 and 2. These wheels carry the picking-stems N, which have a rotary motion of their own, as well as an up and down movement, on account of their attachment to the wheels. Each stem is supported on a rod, $d$, to the extremity of which is rigidly affixed a friction-roll, $e$, journaled in the bifurcated end of a yoke spindle or standard, $f g$. These yoke standards or spindles are provided with springs $h$, which keep the rolls $e$ in frictional contact with the casing-surface, and said yokes and standards are located radially in a circular series in the two rims of the stem-carrying wheel, as shown in Fig. 2, the spindle portion passing through the inner rim, H, while the yoke portion passes through the outer rim, I. The springs serve to render the friction-rolls yielding to any inequalities in the bed or surface on which they roll. Thus when stems and branches of the plant happen to get between the rolls and the rim of the wheels the springs enable the rolls to have sufficient play to move freely over such branches without the breakage of any of the parts. The lower ends of the yoke-spindles are provided with pins $i$, or other suitable devices for keeping them in a normal position. The inner rim, H, is perforated with a series of circular holes for the admission of the round portions $g$ of the yoke-spindles, while the outer rim, I, is provided with a series of peculiarly-shaped slots of the form shown in Fig. 6 and designated by $j$, the shape being that of a longitudinal section of a couple of truncated cones placed end to end. The middle line, $n\,n$, of the slot $j$ is diagonal to the edge of the rim at about an angle of forty-five degrees, (see Fig. 9,) and the yoke of the yoke-spindle is normally situated therein with the wider part parallel to the edge of said rim, so that the roller $e$, which it carries, may move in a groove, $n$, formed along the inner surface of half of the casing C, and so that the stem N will be at right angles to the stem-carrying wheel, or in a horizontal position; but it will be seen that the standard will have considerable play within the slot $j$, so that it may take a position approximately in the middle line of the slot—i. e., diagonal to the edge of the rim—(see Fig. 9, line $n\,n$,) in which case the roll $e$ can no longer travel in a straight groove, wherefore about a half of the interior surface of the casings is not grooved; also, the stem will in this case hang down, as shown in Fig. 3, out of a horizontal position. Thus it will be seen that the interior of the casings C is not a perfect circle, but consists of two concentric semicircles of slightly-different diameter, each one comprising half the said interior surface, the one semicircular part being grooved, so that the friction-rolls will, when the stem-carrying wheels revolve, bear close within the groove and rotate the picker-stems, while the other semicircular portion, being of slightly greater diameter than the first, will be out of contact with the friction-rolls, so that during half of each revolution around the casing the rolls will not bear against it, and consequently the picker-stems will not revolve. (See Fig. 2.)

Therefore the operation of a set of stems will be as follows: In Fig. 2 we are looking from the middle line of the machine at a stem-carrying wheel and the parts carried by it directly before us, the front of the carriage being at our right hand. Only the rollers are here shown, the stems themselves being omitted for the sake of convenience in drawing. Now, the stem-carrying wheel is revolving in the direction of the arrows. The interior of the casing on the left is of smaller diameter and is grooved, so that as the stems pass along this surface their friction-rollers will revolve within the groove, while the stems themselves will be in a horizontal position and rotating in a direction the opposite of that indicated by the arrows. In the stem-carrying wheel of Fig. 2 the slots $j$ are so situated that the lower end of the middle line of those on the left hand, nearest the groove, will be toward the interior of the machine, and the rest of them will have the same relative position to each other. In Fig. 7 we have a perspective of the casing and rims of the wheel within in the same position as they are represented in Fig. 1. Here the slots $j$ on the left-hand part will have the lower end of their middle lines toward the interior of the machine. Now, as the stem-carrying wheels revolve, the stems will be kept in a horizontal position while they are nearest the rear of the machine, since it is evident that the yoke-spindles $f g$ are so situated in the slots that the stems cannot possibly move downward out of a horizontal position, nor can they move upward out of this position, because their own weight keeps them in place, (see Fig. 7;) but when the stems successively reach a point in the rotation of the wheel where the slot, instead of moving up, begins to move down, and where what has hitherto been the top of the slot becomes the bottom, the same reasons for the stems being immovable do not longer obtain, and the weight of the stems causes them to fall into an oblique position, as shown in Figs. 1 and 3. Thus gravity causes the yoke-spindles to move around in the slot to a position where said yokes will be oblique to the edge of the rim, instead of parallel thereto, as when the stems are horizontal. Evidently when the stems are moving up and are horizontal, they might be grasped with the hand and moved until the yokes take the other position in the slot. When the position of the slot is reversed, gravity must accomplish what could heretofore be brought about only by mechanical means. The stems fall into the oblique position at a point near where the friction-rolls leave the surface of the casing and come opposite the part of greater diameter; hence the stem has no independent revolution of its own when out of a horizontal position. When the stems again reach a point where the groove begins, they strike a lug, $k$, which assists in throwing them quickly back into a horizontal position as the stems and slots successively begin again their upward movement.

In Fig. 8 we have shown an enlarged view of the form of yoke-spindle which is preferably used with my machine, the yoke end of which is shown as bent, so that the device is similar in shape and function to a caster. This bent form allows the friction-roller to run in a straight line without being swerved to one side or the other, as might be the case if it were carried on the end of a straight yoke-spindle. When the stems are in the oblique position, they will hardly come into contact at all with the cotton-plant; but in order to prevent any contact and keep the stems from catching the plant, I have placed guards W W on the front of the machine, so that they may cover and shield the oblique stems.

In order to gather the cotton from the stems, a fan-inclosure, O, is secured upon each casing C, as shown in Fig. 5. This inclosure is formed with a spout, P, and contains a revolving fan or brush, Q, which takes the cotton from the stems and carries it up through the spout P, then depositing it in baskets or other receptacles placed on the carriage-flooring in front of the spouts.

The relative arrangement of the parts of the mechanism for actuating a fan and for bringing the stems into contact with it is shown in Figs. 1 and 6. In a standard, R, mounted on the cross-beams of casings C, (see Fig. 7,) is journaled a shaft carrying at one end a pinion, K, and at the other a sprocket-wheel, L. The pinion K meshes with the intermediate gear, J, so that when the driving-gears are actuating the picking mechanism they will likewise actuate the connections which drive the fan. The shaft carrying the fan Q is journaled in a suitable bearing, and is provided at its outer end with a sprocket, S. Directly below this bearing is another bearing containing a short journal having on its outer end a sprocket-wheel, T, and on its inner end a friction-roll, U. The sprockets L, S, and T are connected and driven together by means of a chain band, V. Each fan-casing is provided with a transverse opening, m, at the bottom, Fig. 5, where the brushes come into contact with the stems as they successively pass. The friction-roll U extends into the casing C through a slot, as shown in Fig. 7, so that the friction-roll e of each stem may come into contact with it. This contact results in slightly depressing the roll e, so that it will bear hard upon the roll U, the object of bringing the rolls into contact being to thereby accelerate the rotating speed of the picking-stem, so that it may make a complete revolution against the brush and be wholly relieved of all the cotton it has gathered. The contact of the two rollers also assists in accomplishing another result above referred to—i. e., it assists in throwing the stems away from the horizontal into the oblique position.

The springs h on the spindles g serve to return the yoke-spindles and stems to their normal position after they have passed the speeder-wheel U, and the pin i, inserted through the end of said spindles, limits the extent of such replacement.

It will be noted that my improved machine consists of duplicate mechanism, one portion on each side, the two sides being independent in all ways and exact counterparts of each other. There are therefore two sets of picking-stems—one on each side of the row of cotton-plants. This is a great advantage, as it allows the free passage of the main stalks of the plants between the projecting ends of the picking-stems, so that the plants will not be injured by the machine nor the machine clogged or broken by the stalks or branches of the plants. The dropping of the stems out of the horizontal position into the oblique also accomplishes a beneficial result, for if the stems were kept in a horizontal position at all times they would crowd the plant during their downward motion and greatly injure it without rendering any return in the way of work done, for it is found in practice that they do very little or no picking while moving down; but by placing them obliquely for the time being they are moved out of the way, so that no injurious consequences follow.

Having thus described my invention, what I claim as new, and desire to secure by Letters Patent, is—

1. In a cotton-picker, a stem-carrying wheel with an inner and an outer rim, the former being provided with a series of apertures and the latter with a series of slots, in combination with picking-stems carried by yoked spindles rocking in said apertures and slots, and a guide, the whole arranged and operating so that the stems may be guided into a horizontal position during a part of the revolution of the wheel and may fall into an oblique position during the remainder, substantially as described.

2. In a cotton-picker, a cylindrical casing for containing the picking mechanism, which has half of its interior surface made of greater radius than the other half, substantially as shown and described.

3. The combination, with cylindrical casings having the interior surfaces formed with the semi-circumferences of different radii, of stem-carrying wheels revolving within the said casings and carrying picking-stems provided with rollers that are actuated by frictional contact with the surface having the shorter radius, substantially as shown and described.

4. The combination of cylindrical casings having concentric interior semi-circumferences, double-rimmed stem-carrying wheels revolving within said casings, the inner rim being provided with a series of holes and the outer with a series of slots shaped as the longitudinal section of two truncated cones placed end to end, the lower extremity of the middle lines of the slots being nearest the middle of the machine, and picker-stems provided with rollers for actuating the stems by frictional contact with the casing, said rollers being carried by standards so operating within the slots and apertures of the rims that the stems may gravitate alternately from a horizontal to the oblique position, and the reverse, substantially as shown and described.

5. The combination, with the stem-carrying wheel, whose outer rim is provided with slots in the shape of a longitudinal section of two truncated cones placed end to end, the lower extremity of the middle line of the slots being nearest the middle of the machine, of yoked spindles for supporting picking-stems secured to them at right angles, said spindles being situated within the slots with the yokes parallel to the edges of the rim, but adapted during the rotation of the wheel to move into a position with the yokes oblique to the edge of the rim under the action of gravity, substantially as described.

6. In a cotton-harvester, the combination of a stem-carrying wheel, the picker stems carried thereby and provided with rollers, and a cylindrical casing whose interior surface forms a track, with which the rollers come into frictional contact to actuate the stems, said interior surface having its semi-circumferences of different diameter, the one of shorter diameter having a groove to guide and operate the rollers, substantially as specified and shown.

7. The combination of the driving-wheels having the gears F F, the cylindrical casings C C, having cross-bars c c, at whose intersections are formed shaft-bearings, the shafts journaled in said bearings and having gears G G, and stem-carrying wheels H I, secured upon the said shafts and carrying picking-stems, and the intermediate gears, J, substantially as shown and described.

8. The combination of the rotary shafts, the two-rimmed stem-carrying wheels mounted thereon, their outer rims having slots j and their inner rims a series of apertures, the picker-stems N, having rods d, which carry friction-wheels e, that are supported in yoke-spindles f g, rocking in said apertures and slots, and the casings C, having a circumferential groove and surrounding said stem-carrying wheels, the whole arranged and operated so that the stems may be guided into a horizontal position during a part of the revolution of the wheels and may fall into an oblique position during the remainder, substantially as described.

9. In a cotton-harvester, the combination, with a revolving stem-carrying wheel having an inner and an outer rim and a casing surrounding the wheel, of a set of picking-stems carried by said wheel and actuated as described, which during half the revolution of the wheel are horizontal and in contact with the cotton-plants, but during the other half are in an oblique position out of contact with the plants, substantially as shown and described.

10. In a cotton-harvester, the combination, with a stem-carrying wheel and a set of picking-stems carried thereby, which are automatically adjustable by suitable means from an operative to an inoperative position alternately, of a surrounding casing having a lug, k, which assists in returning each stem from an oblique to a horizontal position, as set forth.

11. In a cotton-picker, the combination, with the double-rimmed wheels C, of the mechanism for carrying the stems, which consists of a friction-roller, e, secured on the end of a rod, d, carrying the stem, said roller being journaled in the bifurcated end of a yoke-spindle, f g, the lower portion of which is rounded at g, and is provided with spring h, and the pin i, arranged and operating for the purposes shown and described.

12. In a cotton-harvester, a series of stems, N N, secured to rods d, which carry friction-rollers e, that are journaled in the bifurcated ends of yoke-spindles f g, said spindles being at right angles to the stems and adapted to uphold the stem in its operations, substantially as and for the purposes shown and described.

13. The combination, with a revolving stem-carrying wheel, of mechanism for carrying and actuating the stems, which consists, essentially, of a friction-roller, e, journaled in the bifurcated end of a caster-shaped standard secured adjustably within the rims of the said band-wheel, as shown, and for the purpose described.

In testimony whereof I affix my signature in presence of two witnesses.

WILLIAM GOFF SEARS.

Witnesses:
PHILIP MAURO,
FRED E. TASKER.